(12) United States Patent
Liddell et al.

(10) Patent No.: US 7,562,074 B2
(45) Date of Patent: Jul. 14, 2009

(54) SEARCH ENGINE DETERMINING RESULTS BASED ON PROBABILISTIC SCORING OF RELEVANCE

(75) Inventors: Craig M. Liddell, McLean, VA (US); Philip J. Holt, South Riding, VA (US)

(73) Assignee: Epacris Inc., McClean, VA (US)

( * ) Notice: Subject to any disclaimer, the term of this patent is extended or adjusted under 35 U.S.C. 154(b) by 211 days.

(21) Appl. No.: 11/536,282

(22) Filed: Sep. 28, 2006

(65) Prior Publication Data

US 2007/0083506 A1 Apr. 12, 2007

Related U.S. Application Data

(60) Provisional application No. 60/721,039, filed on Sep. 28, 2005.

(51) Int. Cl.
*G06F 17/30* (2006.01)
(52) U.S. Cl. .................... 707/3; 707/4; 707/102
(58) Field of Classification Search ............. 707/3–6, 707/102
See application file for complete search history.

(56) References Cited

U.S. PATENT DOCUMENTS

| | | | |
|---|---|---|---|
| 4,839,853 A | 6/1989 | Deerwester et al. | |
| 5,848,407 A | 12/1998 | Ishikawa et al. | |
| 5,913,215 A | 6/1999 | Rubinstein et al. | |
| 6,014,678 A | 1/2000 | Inoue et al. | |
| 6,070,158 A | 5/2000 | Kirsch et al. | |
| 6,233,575 B1 | 5/2001 | Agrawal et al. | |
| 6,246,977 B1 | 6/2001 | Messerly et al. | |
| 6,247,036 B1 * | 6/2001 | Landers et al. | 708/603 |
| 6,285,999 B1 | 9/2001 | Page | |
| 6,510,406 B1 | 1/2003 | Marchisio | |
| 6,519,585 B1 | 2/2003 | Kohli | |
| 6,526,440 B1 | 2/2003 | Bharat | |
| 6,529,903 B2 | 3/2003 | Smith et al. | |
| 6,560,590 B1 | 5/2003 | Shwe et al. | |
| 6,629,092 B1 | 9/2003 | Berke | |
| 6,675,170 B1 | 1/2004 | Flake | |

(Continued)

OTHER PUBLICATIONS

Styrman, Avil, "Ontology-Based Image Annotation and Retrieval," Thesis, University of Helenski, Apr. 27, 2005 [retrieved Jul. 19, 2007] Retrieved from the Internet URL:http://www.cs.helsinki.fi/u/astyrman/gradu.pdf, entire document, especially p. 3-4, 64,66, 92.

*Primary Examiner*—James Trujillo
*Assistant Examiner*—Linh Black
(74) *Attorney, Agent, or Firm*—Foley & Lardner LLP (57) ABSTRACT

A method of providing semantically relevant, ranked search results is described. An assignment of an occurrence of a term within a document to an ontological node is received based on usage of the occurrence of the term within the document. An accuracy value associated with the assignment is determined by comparing the assignment with a baseline assignment. A consistency value associated with an assignor is determined based on a repeatability of a plurality of assignments by the assignor. An assignor relevance score for the occurrence of the term is determined by statistically combining the accuracy value and the consistency value. An overall semantic relevance value for the occurrence of the term is determined by statistically combining the assignor relevance score determined for a plurality of assignors. The documents are ranked based on the overall semantic relevance value and presented in response to a search request.

19 Claims, 4 Drawing Sheets

U.S. PATENT DOCUMENTS

| | | |
|---|---|---|
| 6,678,635 B2 | 1/2004 | Tovinkere et al. |
| 6,687,696 B2 * | 2/2004 | Hofmann et al. ............... 707/6 |
| 6,925,433 B2 | 8/2005 | Stensmo |
| 6,950,753 B1 | 9/2005 | Rzhetsky et al. |
| 6,983,282 B2 | 1/2006 | Stern et al. |
| 6,993,586 B2 | 1/2006 | Chen et al. |
| 6,999,959 B1 | 2/2006 | Lawrence et al. |
| 7,013,303 B2 | 3/2006 | Faybishenko et al. |
| 7,013,308 B1 | 3/2006 | Tunstall-Pedoe |
| 7,024,400 B2 | 4/2006 | Tokuda et al. |
| 7,051,017 B2 | 5/2006 | Marchisio |
| 7,058,628 B1 | 6/2006 | Page |
| 7,069,254 B2 | 6/2006 | Foulger et al. |
| 7,085,736 B2 | 8/2006 | Keezer et al. |
| 7,089,252 B2 | 8/2006 | Tomlin et al. |
| 2004/0024756 A1 * | 2/2004 | Rickard ......................... 707/3 |
| 2004/0093331 A1 * | 5/2004 | Garner et al. ................. 707/3 |
| 2004/0111408 A1 * | 6/2004 | Caudill et al. ................. 707/3 |
| 2005/0060290 A1 | 3/2005 | Herscovici et al. |
| 2005/0080774 A1 | 4/2005 | Janssen et al. |
| 2005/0091193 A1 * | 4/2005 | Frank et al. ................... 707/1 |
| 2005/0108200 A1 | 5/2005 | Meik et al. |
| 2005/0125434 A1 * | 6/2005 | Fan et al. .................... 707/102 |
| 2005/0149499 A1 | 7/2005 | Franz et al. |
| 2005/0197783 A1 * | 9/2005 | Kuchinsky et al. ............ 702/19 |
| 2005/0203924 A1 * | 9/2005 | Rosenberg ................. 707/100 |
| 2006/0143159 A1 | 6/2006 | Chowdhury et al. |
| 2006/0155693 A1 | 7/2006 | Chowdhury et al. |
| 2006/0155694 A1 | 7/2006 | Chowdhury et al. |
| 2006/0184521 A1 | 8/2006 | Ponte |

* cited by examiner

SEARCH ENGINE DETERMINING RESULTS BASED ON PROBABILISTIC SCORING OF RELEVANCE

RELATED APPLICATIONS

The present application claims priority to U.S. Provisional Patent Application No. 60/721,039, filed on Sep. 28, 2005, and titled "IMPROVING THE RELEVANCE OF SEARCH RESULTS AGAINST LARGE SCALE INFORMATION REPOSITORIES USING PROBABILISTIC SCORING BASED ON THE INTEGRATION OF AN ARBITRARY NUMBER OF MAPPED ONTOLOGIES," the disclosure of which is incorporated herein by reference in its entirety.

FIELD OF THE INVENTION

The subject of the disclosure relates generally to search engines used to locate electronic documents relating to a topic of interest to a user. More specifically, the disclosure relates to a search engine capable of returning search results that are ranked based on a probabilistic scoring of relevance.

BACKGROUND OF THE INVENTION

In general, a search engine can be used to locate, retrieve, and/or present information contained within a corpus. A corpus can include, but is not limited to, all documents accessible via an electronic network such as the Internet, a set of documents related to a specific topic, one or more periodicals, or any other set or subset of electronic information or data objects. Search engines generally receive search requests (or queries) from a search engine user (or searcher) via a search engine user interface. Traditional search engines parse the search request and implement a binary matching algorithm to identify documents that contain one or more search terms from the parsed search request. The binary matching algorithm can identify documents based on a keyword index associated with the document. The search engine returns identified documents to the user based solely on the existence of binary matches. Alternatively, some search engines return identified documents and present them based on both the existence and the number of binary matches.

In an environment where vast quantities of data and information must be quickly searched for meaningful content, relying solely on keyword indexing and binary matching can lead to a large number of spurious and/or irrelevant results. The volume of current data and information and the rate of its growth make the continued use of this approach intractable.

Many methods have been proposed to improve the quality of search results returned by search algorithms. One such method involves routing search requests through a static ontology. The static ontology creates variations of the search request which in turn retrieve information from previously categorized information sources within a corpus. Another proposed method involves the use of natural language processing and other linguistic techniques to provide better document indexing. Another proposed method involves the use of inference engines to pre-process search requests before the search request is issued. Yet another proposed method involves the use of meta-search engines. Meta-search engines submit search requests to multiple third party search engines and provide a consolidated search result using a variety of heuristic and statistical methods.

Another proposed method for improving the effectiveness of search engines involves creating inverted indices, linked lists of terms, and/or expanded terms and searching a database of surrogates instead of the documents themselves. Yet another proposed method uses hypertext metadata as a surrogate to index documents and take advantage of the embedded hyper text markup language standard. Yet another proposed method utilizes rules based classification dependent upon an expert rule. This method is similar to the inference engines in that search requests are pre-processed before they are submitted. Another proposed method involves the use of structured languages and Boolean logic to search a corpus Yet another proposed method involves the use of multiple indexes to cross map ambiguous search requests. Another proposed method involves the use of Bayesian networks to improve the relevance of document classifiers. Yet another proposed method involves latent semantic indexing of text in multiple languages to determine the relatedness of documents in hyper-geometric space. Another proposed method involves the statistical analysis of bulk text and the creation of topic paths to classify documents.

While some of the methods described above have increased the effectiveness of search engines, many problems still exist. Specifically, search engines still return overwhelming amounts of irrelevant and/or spurious documents in response to a typical search request. Thus, there is a need for a search engine that maximizes the relevance of the search results.

SUMMARY

Exemplary embodiments provide a search engine that utilizes probability theory to improve the likelihood that documents returned as a result of a search are pertinent and relevant to a search query. Multiple independent assignments of terms to nodes of an ontology are analyzed statistically based on an accuracy measure and a consistency measure to provide ranked, semantically relevant search results.

An exemplary method of identifying relevant information while a user browses a network is provided. An assignment of an occurrence of a term within a document to an ontological node is received based on usage and context of the occurrence of the term within the document. An accuracy value associated with the assignment is determined by comparing the assignment with a baseline assignment. A consistency value associated with an assignor is determined based on a repeatability of a plurality of assignments by the assignor. An assignor relevance score for the occurrence of the term is determined by statistically combining the accuracy value and the consistency value. An overall semantic relevance value for the occurrence of the term is determined by statistically combining the assignor relevance score determined for a plurality of assignors. The documents are ranked based on the overall semantic relevance value and presented in response to a search request including a keyword associated with the ontological node.

Another exemplary embodiment of the invention includes computer-readable instructions that, upon execution by a processor, cause the processor to implement the operations of the method.

Other principal features and advantages of the invention will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings, wherein like numerals will denote like elements.

DETAILED DESCRIPTION

Described below are a method, device, system, and computer program product capable of creating and returning ranked, semantically relevant search results in response to a search request. In an exemplary embodiment, documents within a corpus can be evaluated, and terms within the documents identified. A term can be a single word, a phrase, and/or a combination of words and phrases. In some cases, a plurality of interpretations may be associated with an identified term. Each identified interpretation can be associated with an ontological node of an ontology. An ontology can include, but is not limited to, a thesaurus, dictionary or other controlled vocabulary. One or more expert assignors can review each document within the corpus or a subset of the corpus and assign each occurrence of an identified term to an ontological node associated with an interpretation of the identified term based on usage of the term in the document for that occurrence. One or more general assignors can also review each document within the corpus or a subset of the corpus and assign each occurrence of an identified term to an ontological node based on an interpretation of the identified term.

An accuracy value representing the likelihood of a given assignor correctly assigning an identified term to an ontological node can be calculated for each general assignor. The assignment made by the expert assignor can be defined as a baseline to evaluate the correctness of an assignment made by a general assignor and used to calculate accuracy. In addition, a consistency value representing the likelihood of reproducibility of an assignment can be calculated for each assignor. Using the accuracy value and the consistency value, an assignor relevance score can be calculated for each assignor and for each occurrence of a term. The assignor relevance score of each assignor can be statistically combined to determine an overall semantic relevance value for each occurrence of a term. The overall semantic relevance value represents the likelihood that a specific occurrence of a term is relevant to a specific interpretation of the term. This value can be used to rank documents as search results. As such, a ranked, semantically relevant list of search results can be returned to a searcher. This process and these calculations are described in more detail below.

Figure 1:
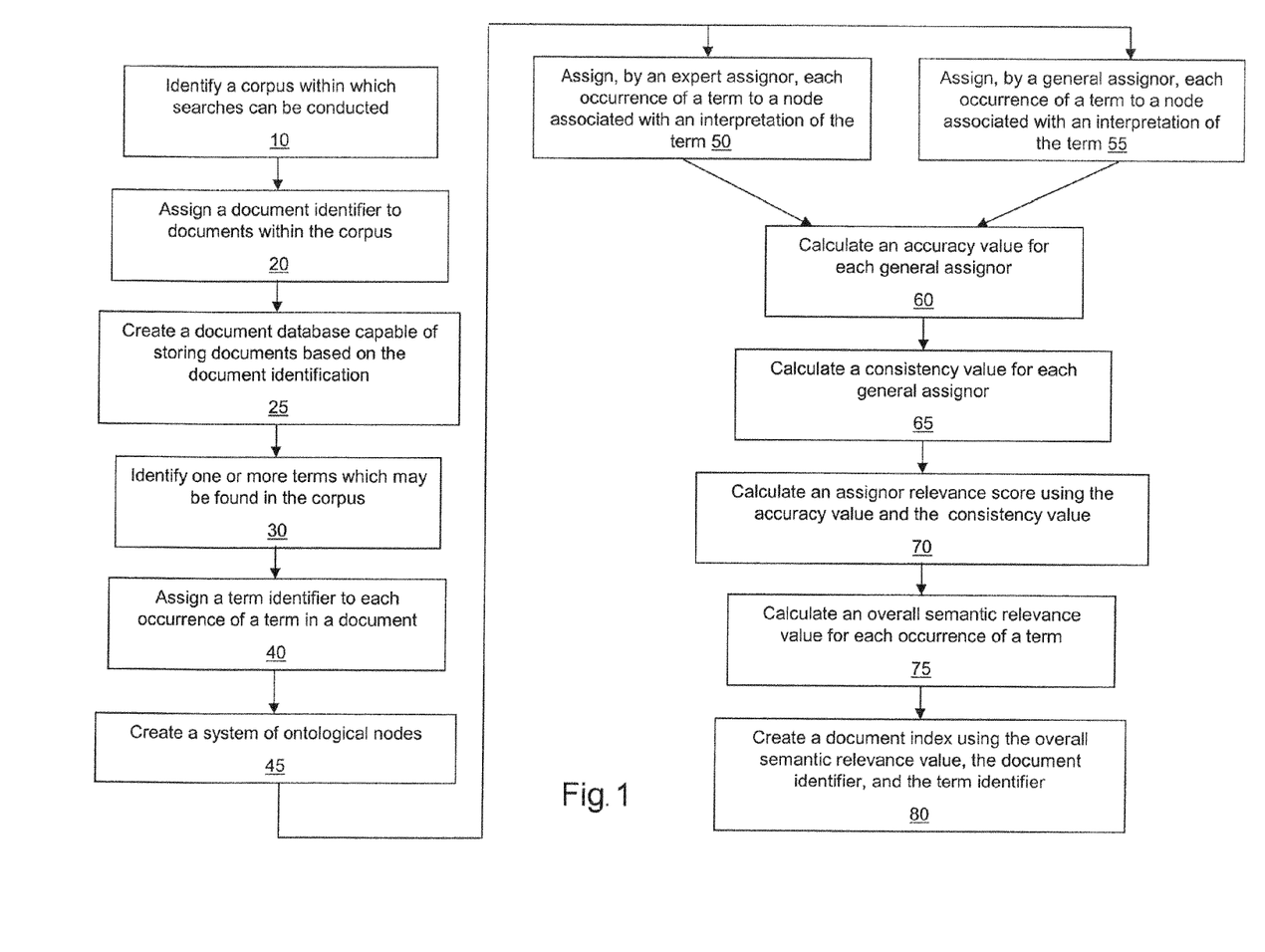
FIG. 1 is a flow diagram illustrating a process used to create ranked, semantically relevant search results in accordance with an exemplary embodiment.

With reference to FIG. 1, a flow diagram depicting a process used to obtain ranked, semantically relevant search results is shown in accordance with an exemplary embodiment. In an operation 10, a corpus within which searches can be conducted is identified. The corpus can include, but is not limited to, all documents accessible via an electronic network such as the Internet, a set of documents related to a specific topic, one or more periodicals, a data object, or any other set, subset, grouping, or collection of electronic information.

In an operation 20, a document identifier is assigned to documents within the corpus. A document can be any type or form of electronic information, including, but not limited to, pdf files, web pages, spreadsheets, word processed documents, text files, images, other data objects, etc. The document identifier can be a number, one or more letters, a symbol, a combination of numbers, letters, and/or symbols, or any other element capable of identifying the document. In an exemplary embodiment, each document within the corpus is assigned a document identifier. The document identifier can be assigned manually by an individual or automatically by a computer or other automated method depending on the embodiment.

In an operation 25, a document database capable of storing documents based on the document identifier is created. The document database can be integrated into the search engine or exist as a separate entity, depending on the embodiment. In an exemplary embodiment, the document database returns a document based on a document identifier included with a request. The document database can return links or other pointers to documents or the actual documents themselves depending on the embodiment.

In an operation 30, one or more terms which may be found in the corpus are identified. The identified terms can include words and/or phrases that are potentially ambiguous or that may have more than one interpretation. In one embodiment, the identified terms can be created without examining any documents within the corpus. For example, the terms can be identified by considering a specific topic within the corpus. In a corpus that contains electrical engineering journal articles, the term 'current' can be identified. In such journals, the term current may refer to the flow of electricity. However, a searcher interested in hydroelectric power may seek an interpretation of current that refers to the strength of water flow in a river. Similarly, a searcher looking for new developments in the field may seek an interpretation of current that refers to a recent occurrence. Alternatively, terms can be identified irrespective of the topic or topics founds within a corpus.

In an alternative embodiment, terms can be identified during or after an examination of one or more documents in a corpus. In another alternative embodiment, every term within a specific document or within a specific corpus can be identified. The identification of terms can be implemented manually by an individual or automatically by a computer or other automated method depending on the embodiment.

In an operation 40, a term identifier is assigned to each occurrence of a term in a document. For example, a document A within a corpus can include five occurrences of the identified term 'cure.' Each of the five occurrences of a term can be assigned a distinct term identifier. Further, each occurrence of an identified term in each document can be assigned a term identifier. As such, every occurrence of the identified term 'cure' within an entire corpus can be assigned a distinct term identifier. The term identifier can be a number, one or more letters, a symbol, a combination of numbers, letters, and/or symbols, or any other element capable of identifying a term. The term identifier can be assigned manually by an individual or automatically by a computer or other automated method, depending on the embodiment.

In an operation 45, a system of ontological nodes is created. The system of ontological nodes can form an entire ontology or exist as part of a larger ontology. An ontology can be a computer readable database of relationships between one or more terms and one or more interpretations of the terms. In one embodiment, the system of ontological nodes can be implemented in a hierarchical arrangement.

In an operation 50, an expert assignor assigns each occurrence of an identified term to an ontological node associated with an identified interpretation of the term as used at each location in each document of the corpus. The assignment made by an expert assignor can be the standard from which to evaluate the correctness of an assignment made by a general assignor. In one embodiment, the expert assignor is one or more knowledgeable human beings who review each document and manually assign each identified term to an ontological node. For example, if the corpus consists of organic chemistry journal articles, the expert assignor can be one or more individuals who are considered knowledgeable in the field of organic chemistry. In an alternative embodiment, the expert assignor can be an automated computer application, algorithm, heuristic method, or other automated method.

In an operation 55, a general assignor assigns each occurrence of an identified term to an ontological node associated with an identified interpretation of the term as used at each location in each document of the corpus. In one embodiment, the general assignor is one or more human beings who go through each document within a corpus and manually assign each identified term to an ontological node. Alternatively, the general assignor can be an automated computer application, algorithm, heuristic method, or other automated method. In one embodiment, there is one expert assignor and a plurality of general assignors.

In an operation 60, an accuracy value is calculated for each general assignor. Accuracy can represent the probability that an assigned interpretation by a given assignor is correct. The accuracy value for a general assignor can be calculated based on all of the assignments made by the general assignor for which an expert assignor has also made an assignment. The assignment by the expert assignor can act as the standard from which to judge "correctness" of assignments made by general assignors. Accuracy can be calculated using Equation 1. The denominator represents the total number of assignments made by a general assignor (for which an expert assignor has also made an assignment) and the numerator represents the number of assignments made by the general assignor that match the assignment made by the expert assignor.

Equation 1:

$$\text{ACCURACY} = \frac{\sum \text{Correct Assigments by an Assignor}}{\sum \text{Total Assignments by the Assignor}}$$

In an operation 65, a consistency value is calculated for each general assignor. Consistency can represent the likelihood of reproducibility of a given assignment of a term to an ontological node by a given assignor. Given t terms in a corpus and p trials, consistency can represent the likelihood that a given assignor assigns each of the t terms to the same ontological node in each of the p trials. Consistency can range from 0 to 1, based on p trials. A consistency value of 0 means that the assignor never assigned a term to the same ontological node for all p trials. A consistency value of 1 means that the assignor assigned each term to the same ontological node each of the p times that the assignor encountered the term. In one embodiment, consistency values can be determined by presenting an assignor with the same corpus multiple times. Consistency can be calculated using Equation 2, where p is the number of trials, m is the number of matches, and t is total number of terms assigned. A match can be defined as an assignment of a term to the same ontological node each of the p times that an assignor encountered that term.

Equation 2:

$$\text{CONSISTENCY} = \frac{m * p}{t * p}$$

For example, an assignor may assign each of 1000 terms in a corpus to ontological nodes in five different trials Thus, t=1000 and p=5. The value m can range anywhere from 0 (no consistency) to 1000 (perfect consistency). The number of matches m is the number of times that the assignor assigned a term to the same ontological node each of the five times that the assignor encountered the term. The number of matches m can range anywhere from 0 (no consistency) to 1000 (perfect consistency). If m=994, consistency C=(994)(5)/(1000)(5)= 0.994=99.4%.

The general assignors can be evaluated for inclusion into the calculation for overall semantic relevance value using parametric statistical hypothesis testing based on the assumption of normal distribution. If a general assignor is assigning terms randomly to the ontology nodes then that assignor can add no value to an index built from a plurality of assignors. As a result, assignments made by the assignor should not be included in the determination of overall semantic relevance. For example, a mean and a variance associated with the assignments made by two assignors matched to each other and matched to the expert assignor are calculated. The null hypothesis may be defined as the hypothesis that both assignors are assigning terms randomly with respect to each other and the expert assignor. In this example, the mean is calculated form equation 3 and the variance is calculated from equation 4.

Equation 3:

$$\text{Average} = \frac{\sum_{1}^{n} \left( \begin{array}{l} \text{Assignor Relevance1}_n * \\ \text{Assignor Relevance2}_n \end{array} \right)}{n}$$

Equation 4:

$$\text{Variance} = \sum_{1}^{n} \left( ((\text{Assignor } Relevance_n - \text{Average})/n - 1 \right)$$

To test if each assignor is assigning terms randomly, the following t-test statistic can be calculated using equation 5 assuming a common variance s and a number of trials n.

Equation 5:

$$t = \frac{(Average_{Assingor1} - Average_{Assingor1*2}) - (Average_{Assinor2} - Average_{Assignor1*2})}{\sqrt{2s^2/n}}$$

A t-statistic that is significant according to the Students t-tables indicates that the null hypothesis is rejected, and thus, that the assignors are assigning terms systematically. A highly significant t-statistic could indicate that the assignors are not statistically independent which is satisfactory for the subsequent processing.

A similar analysis comparing the general assignors to the expert assignor can test the null hypothesis that the general assignors are randomly assigning terms with respect to the expert assignor. To calculate these statistics, a corpus may be examined. For example, assume in a corpus of 100 documents that the expert assignor assigns 750 terms and that two general assignors A and B assign 700 and 775 terms, respectively. The average for the comparison of assignor A and B can be calculated using equation 3, for example, as 0.144, and the variance can be calculated using equation 4 as 0.003. The resulting t-statistic for this comparison is calculated using equation 5 as 546.1. The t-statistic for two means and one degree of freedom at the 1% probability level is 63.625. Thus, the resulting t-statistic is larger than the 1% probability level. This indicates that the null hypothesis is rejected, and that the assignments of the two assignors are not being randomly assigned. As a result, inclusion of the assignments of the two assignors appears to provide value because the assignments do not indicate merely random assignments.

The consistency and the accuracy of the assignments by assignors are assumed to be independent. Thus, for example, the accuracy value of n assignors can be represented probabilistically as $C1*C2 \ldots *Cn$. Also, the probability of all assignors failing to correctly assign a particular occurrence of a term to a particular interpretation can be represented as $(1-C1)*(1-C2) \ldots *(1-Cn)$. For large C (above ~0.70), the probability of multiple assignors incorrectly assigning a given occurrence of a term becomes very small. For example, if two assignors A1 and A2 have accuracy values of C1=0.8 and C2=0.7, respectively, the probability that neither A1 nor A2 will correctly assign an occurrence of a term is only 0.06. If assignor A3 has an accuracy value C3=0.9, the probability that none of A1, A2, and A3 will correctly assign a given occurrence of a term is only 0.006. Using the normal approximation for the distribution of means for accuracy values and establishing confidence limits for observed outcomes, the expected accuracy of a correct assignment of a given occurrence of a term can be increased significantly using standard statistical methods and probability theory.

In an operation 70, an assignor relevance score is calculated using the accuracy value and the consistency value for the assignor. An assignor relevance score can be calculated for each occurrence of a term and for each assignor. Assignor relevance can represent a probabilistic measure of the likelihood that a particular assignment of a term by a particular assignor is accurate and consistently identified. Assignor relevance scores can be calculated using Equation 6, where accuracy and consistency can be obtained using Equations 1 and 2, respectively.

ASSIGNOR RELEVANCE=ACCURACY*CONSISTENCY    Equation 6:

In an operation 75, an overall semantic relevance value is calculated for each occurrence of a term in each document. The overall semantic relevance value represents the likelihood that a specific occurrence of a term in a document is relevant to a specific interpretation of the term. The overall semantic relevance value can be calculated using Bayes' Theorem, which is shown as Equation 7 below.

Equation 7:

$$P(A \mid B) = \frac{P(B \mid A) * P(A)}{P(B \mid A) * P(A) + P(B \mid A') * P(A')}$$

In essence, Bayes' Theorem states that the probability of a hypothesis, given original data and some new data, is proportional to the probability of the hypothesis, given the original data only, and the probability of the new data, given the original data and the hypothesis. In other words, Bayes' Theorem tells how to update or revise beliefs in light of new evidence. Equation 8 shows an application of Bayes' Theorem in the present context where $H_1$ represents an assignment of a term made by a first assignor, $H_2$ represents an assignment of the term made by a second assignor, and $H_1'$ represents the complement of $H_1$.

Equation 8:

$$P(H_1 \mid H_2) = \frac{P(H_2 \mid H_1) * P(H_1)}{P(H_2 \mid H_1) * P(H_1) + P(H_2 \mid H_1') * P(H_1')}$$

The probabilities associated with the first assignment $H_1$ and the second assignment $H_2$ can be the assignor relevance scores calculated using Equation 6. The probability associated with $H_1'$ is $(1-P(H_1))$. In an exemplary embodiment, the probabilities associated with the first and second assignment can be the consistency values for the first and second assignors, respectively. Alternatively, the probabilities associated with the first and second assignment can be the accuracy values for the first and second assignors, respectively. In a preferred embodiment, the relevancy values are used in Equation 8.

As a simplified example of iterative application of Bayes' Theorem, assignments $H_1$-$H_5$, each made by a distinct assignor (Assignors 1-5), can each have an assignor relevance score of 0.6. Further, all five assignors can agree with one another regarding the assignment of the occurrence of a term. The first iteration of Bayes' Theorem takes into account assignment $H_1$ and assignment $H_2$ (made by Assignor 1 and Assignor 2) and yields: $(0.6*0.6)/((0.6*0.6)+(0.4*0.4))=0.692$. The numerator $(0.6*0.6)$ is the probability that Assignor 2 assigns the same term to the same node as Assignor 1 given that Assignor 1 has already assigned the term to the correct node (0.6) times the prior probability that Assignor 1 assigned the term to the correct node (0.6). The denominator is $(0.6*0.6)$ (as defined for the numerator) plus the probability that Assignor 2 assigns the term to the incorrect node given that Assignor 1 has already assigned the term to the node in question (0.4) times the prior probability that Assignor 1 assigned the term to the incorrect node (0.4).

The second iteration of Bayes' Theorem, which takes into account assignment $H_3$ (made by Assignor 3), utilizes the result of the first iteration and yields: $(0.692*0.6)/((0.692*0.6)+((1-0.692)*0.4))=0.77$. Here, the numerator $(0.692*0.6)$ represents the probability that Assignor 3 assigns the same term to the same node as Assignors 1 and 2 given that Assignor 1 has already assigned the term to the correct node (0.6) times the prior probability that Assignors 1 and 2 assigned the term to the correct node (0.692). The denominator is $(0.692*0.6)$ (as defined for the numerator) plus the probability that Assignor 3 assigns the term to an incorrect node given that Assignors 1 and 2 have already assigned the term to the node in question (0.4) times the prior probability that Assignors 1 and 2 assigned the term to the wrong node $(1-0.692)$.

Similarly, the third iteration of Bayes' Theorem, which takes into account assignment $H_4$ (made by assignor 4), utilizes the result of the second iteration and yields: $(0.77*0.6)/((0.77*0.6)+((1.0-0.77)*0.4))=0.84$. The fourth iteration of Bayes' Theorem, which takes assignment $H_5$ (made by assignor 5) into account, utilizes the result of the third iteration and yields: (0.84*0.6)/((0.84*0.6)+((1−0.84)*0.4))= 0.89. Thus, the overall semantic relevance value for this particular occurrence of a term, based on the assignments made by Assignors 1-5 is 0.89.

From the previous example, if Assignor 2 disagrees with Assignor 1, the first iteration of Bayes' Theorem yields: (0.4*0.4)/((0.4*0.4)+(0.6*0.6))=0.3078. The numerator (0.4*0.4) represents the probability that Assignor 2 assigns the same term to a different node than Assignor 1 given that Assignor 1 has already assigned the term to the correct node (0.4) times the prior probability that Assignor 1 assigned the term to an incorrect node (0.4). The denominator is (0.4*0.4) (as defined for the numerator) plus the probability that Assignor 2 assigns the term to the correct node given that Assignor 1 has already assigned the term to an incorrect node (0.6) times the prior probability that Assignor 1 did not assign the term to an incorrect node (0.6). If Assignor 3 agrees with Assignor 1, the second iteration of Bayes' Theorem yields: (0.3078*0.6)/((0.3078*0.6)+((1.0−0.3078)*0.4))=0.4. Here, the numerator (0.3078*0.6) represents the probability that Assignor 3 assigns the term to the same node as Assignor 1 given that Assignor 1 has already assigned the term to the correct node (0.6) times the prior probability that Assignors 1 and 2 assigned the term to the correct node (0. 3078). The denominator is (0.3078*0.6) (as defined for the numerator) plus the probability that Assignor 3 assigns the term to an incorrect node given that Assignor 1 has already assigned the term to the node in question (0.4) times the prior probability that Assignors 1 & 2 assigned the term to an incorrect node (1−0.3078). Similarly, if Assignor 4 agrees with Assignor 1, the third iteration of Bayes' Theorem yields: (0.4*0.6)/ ((0.4*0.6)+((1.0−0.4)*0.4))=0.5. If Assignor 5 also agrees with Assignor 1, the fourth iteration of Bayes' Theorem yields: (0.5*0.6)/((0.5*0.6)+((1.0−0.5)*0.4))=0.6.

The overall semantic relevance value can act as the standard by which the relevance of the occurrence of a term within a particular document can be ranked. For example, the term 'serious' can occur once in a document 3, twice in a document 4, and three times in a document 5. Identified interpretations of serious can include, but are not limited to, earnest, meaningful, and important. Using assignor relevance scores for any given number of assignors, the overall semantic relevance score for each occurrence of the term serious can be calculated. Each occurrence can have an overall semantic relevance value for each of the three identified interpretations. For example, assignor A can assign an occurrence of serious to an 'earnest' ontological node, assignor B can assign the same occurrence to a 'meaningful' ontological node, and assignor C can assign the same occurrence to an 'important' ontological node. In such a case, that particular occurrence of the term serious can have an overall relevance value for each of the three identified term interpretations. If no assignor assigns a given occurrence of a term to a given interpretation, the overall semantic relevance value for that occurrence of a term with respect to that interpretation can be zero.

Continuing the example from the last paragraph, term 1 in document 3 (i.e., the first and only occurrence of the term serious in document 3) can have an overall semantic relevance value of 0.05. This relatively low overall semantic relevance value implies that document 3 is not very relevant to a search request seeking the 'earnest' interpretation of serious. In one embodiment, an overall semantic relevance value threshold can be established. If the overall semantic relevance value for a given occurrence of a term falls below the overall semantic relevance value threshold, the document within which the occurrence of a term occurs is not returned as a search result based on that occurrence of a term. However, the document can still be returned as a search result if another occurrence (of the same interpretation of the same underlying term) has an overall semantic relevance value which exceeds the overall semantic relevance value threshold. In an alternative embodiment, any document which contains an occurrence of a term that has an overall semantic relevance value greater than zero can be returned as part of a ranked search result.

Terms 1 and 2 in document 4 (i.e., the first and second occurrences of the term serious in document 4) can have an overall semantic relevance value of 0.88 and 0.92, respectively. These relatively high overall semantic relevance values indicate that document 4 is highly relevant to a search request seeking the 'earnest' interpretation of serious. In one embodiment, multiple occurrences of a term with high overall semantic relevance values in a given document can increase the rank of the document. In an alternative embodiment, document rank is independent of the number of occurrences of a term in the document. In another alternative embodiment, document rank can be based on an average of all of the overall semantic relevance values of each interpretation of each term within the document.

Terms 1, 2, and 3 in document 5 (i.e., the first, second, and third occurrences of the term serious in document 5) can have overall semantic relevance values of 0.82, 0.06, and 0.08, respectively. Thus, in the current example, in response to a search request seeking the 'earnest' interpretation of the term serious, the ranked search results can be document 4 (which contains the occurrence of the term serious with the highest overall semantic relevance value for the 'earnest' interpretation), followed by document 5, followed by document 3.

With respect to the 'meaningful' interpretation of the term serious, term 2 in document 4 can have an overall semantic relevance value of 0.05 and term 2 in document 5 can have an overall semantic relevance value of 0.80. In response to a search request seeking the 'meaningful' interpretation of serious, the ranked search results returned to the searcher can be document 5 followed by document 4. Alternatively, if an overall semantic relevance value threshold is greater than 0.05 but less than 0.80, document 5 can be the only search result returned. In one embodiment, if the number of ranked search results is less than a search result threshold value, additional results can be returned, where the additional results are obtained using a standard keyword and binary matching method or other known method.

In the current example, the 'important' interpretation of serious can have no overall semantic relevance values associated with it. This implies that none of the assignors assigned any occurrence of the term serious in any of the documents to the 'important' ontological node. In response to a search request seeking the 'important' interpretation of the term serious, no documents or an error message can be returned to the searcher. Alternatively, a standard set of search results obtained by a keyword and binary matching method or other known method can be returned. The example discussed above is illustrated in Table 1 below.

TABLE 1

| Identified Interpretations of the Term 'Serious' | Document Identifier | Term Identifier | Overall Semantic Relevance Value |
| --- | --- | --- | --- |
| Earnest | Document 3 | Term 1 | 0.05 |
|  | Document 4 | Term 1 | 0.88 |
|  | Document 4 | Term 2 | 0.92 |
|  | Document 5 | Term 1 | 0.82 |

TABLE 1-continued

| Identified Interpretations of the Term 'Serious' | Document Identifier | Term Identifier | Overall Semantic Relevance Value |
|---|---|---|---|
| | Document 5 | Term 2 | 0.06 |
| | Document 5 | Term 3 | 0.08 |
| Meaningful | Document 4 | Term 2 | 0.05 |
| | Document 5 | Term 2 | 0.80 |
| Important | | | |

A term in a search request can be composed of multiple words (i.e., phrases, sayings, etc.) In one embodiment, documents which contain relevant multiple word terms can be ranked higher than documents which only contain relevant single word terms. Further, a search request can be composed of multiple terms. Multiple term search requests can be ranked in several ways. In one embodiment, documents containing the highest relevance terms from such a search request can be ranked by high scoring terms or by an average of overall semantic relevance values of all the terms in the search request. In an alternative embodiment, documents can be ranked based on the overall semantic relevance value of the first term, followed by the overall semantic relevance value of the second term, followed by the overall semantic relevance value of the third term, and so on. In another alternative embodiment, documents can be ranked by a proximity of terms from the search request within the document. For example, documents can be ranked by a first search term and then ranked by a second search term only if the second search term occurs in the same sentence, in the same paragraph, on the same page, etc. Similarly, documents can be ranked by the relevance of a third term only if the third term is in the same sentence, in the same paragraph, on the same page, etc., and so on. Alternatively, documents can be ranked by an average overall semantic relevance value for all of the terms in a multiple term search request. In another alternative embodiment, documents can be ranked by searcher input to help select the most relevant nodes and associated documents.

in an operation 80, a document index is created using the overall semantic relevance value, the document identifier, and the term identifier. The document index can be a database, a file, or any other repository capable of storing and/or arranging information. The document index can be used to keep track of all the information associated with each occurrence of identified terms and quickly create a ranked list of relevant documents. The list of ranked, relevant documents can identify the documents using the document identifier. When a search request is received by the search engine, after prompting the searcher to select interpretations of any search terms that are assigned to multiple ontological nodes, the search engine can utilize the document index to determine which documents are most relevant to the search request. Relevant documents can be selected and ranked by the search engine. The search engine can utilize the document database to retrieve documents that are considered relevant. Alternatively, the document database can be used to return links to any relevant documents.

An exemplary implementation of the above-described process can include four general assignors and one expert assignor assigning 986 terms to one of over 2500 nodes in a predefined ontology, where the terms occur in a corpus consisting of 6 documents containing approximately 5000 words in total. The subject of the corpus can be news reports about Iranian nuclear ambitions as reported by different news organizations from both the Middle East and western news agencies. Each assignor can be asked to assign each of the 986 terms to one and only one node of the ontology such that the assignment best represents the meaning of the term in context as it occurs in each of the six documents.

The expert assignor can assign each of the 986 terms to one of the ontological nodes, and these assignments can be used to determine the "correctness" of assignments made by the general assignors. An accuracy value can be calculated for each of the general assignors using Equation 1. General assignor A made 986 assignments and assigned 674 terms to the same node as the expert assignor. Thus, the accuracy value for assignor A is 674/986=0.68. General assignor B made 864 assignments and assigned 496 terms to the same node as the expert assignor. General assignor B, thus, did not identify 122(986-864) of the terms at all. The accuracy value for general assignor B is 496/864=0.57. General assignor C made 981 assignments and assigned 550 terms to the same node as the expert assignor. Thus, similarly, the accuracy value for general assignor C is 550/981=0.56. General assignor D made 986 assignments and assigned 649 terms to the same node as the expert assignor. Thus, similarly, the accuracy value for general assignor D is 649/986=0.66.

A consistency value can also be calculated for each of the general assignors by having them repeat the assignment of each of the 986 terms in the corpus two or more times and using Equation 2. General assignor A can repeat the assignment of each of the 986 terms in the corpus twice. if, during the second repetition, general assignor A assigns 972 of the words to the same node as the first repetition, t=986, p=2, and m=972. Using Equation 2, consistency=(972*2)/(986*2)= 0.985. Utilizing Equation 2, a consistency value of 0.99 may be calculated for each of the other general assignors.

Using the accuracy value and consistency value, an assignor relevance score can be calculated for each of the general assignors. The assignor relevance score associated with each of the general assignors can be used in an iterative application of Bayes' Theorem to calculate an overall semantic relevance value for each occurrence of a term. General assignor A has an accuracy value of 0.68 and a consistency value of 0.99. General assignor A was arbitrarily used to determine the definitive semantic node for the relevance calculations below. Using Equation 6, an assignor relevance score (0.99*0.68) can be calculated for general assignor A. Similarly, an assignor relevance score (0.99*0.57) can be calculated for general assignor B. If general assignors A and B agree on a particular assignment of a term, the overall semantic relevance value for that term occurrence for the ontology nodes assigned by general assignor A, can be calculated using Equation 8: overall semantic relevance= (0.99*0.57)*(0.99*0.68)/((0.99*0.57)*(0.99*0.68)+((1− 0.99*0.57)*(1−0.99*0.68)))=0.727. If general assignors A and B disagree on a particular assignment of a term, the overall semantic relevance value for that term occurrence, with respect to these two general assignors, can be calculated using Equation 8:overall semantic relevance=(1− 0.99*0.57)* (1−0.99*0.68)/((1−0.99*0.57)*(1−0.99*0.68)+ (0.99*0.68)= 0.175.

A second iteration of Bayes' Theorem can be performed to take general assignor C into consideration. General assignor C has an assignor relevance score of (0.99*0.56). If general assignor C agrees with both general assignor A and general assignor B on a particular assignment of a term, overall semantic relevance =(0.727*(0.99*0.56)/((0.727* (0.99*0.56))+(1−0.727)*(1−0.99*0.56))=0.768. If assignor A and B agree on a particular assignment of a term, but assignor C does not agree, overall semantic relevance= ((0.727*(1−0.99*0.56))/(((0.727*(1−0.99*0.56))+((1− 0.727)*(0.99*0.56)))))=0.682. If assignors A and B disagree and assignor C agrees with A, overall semantic relevance= ((0.175*(0.99*0.56))/((0.175*(0.99*0.56))+((1−0.175)*(1−0.99*0.56))))=0.208. If assignors A and B disagree and assignor C disagrees with A, overall semantic relevance= ((0.175*(1−0.99*0.567))/(((0.175*(1−0.99*0.56))+((1−0.175)*(0.99*0.56)))))=0.143.

A third iteration of Bayes' Theorem can be performed to take general assignor D into consideration. General assignor D has an assignor relevance score of (0.99*0.66). Using Bayes' Theorem, if general assignor D agrees with assignors A, B, and C, overall semantic relevance=((0.768*(0.99*0.66))/((0.768*(0.99*0.66))+((1−0.768)*(1−0.99*0.66))))=0.862. If assignor D agrees with assignor A and B but assignor C does not agree, overall semantic relevance=((0.682*(1−0.99*0.66)/(((0.682*(1−0.99*0.66))+((1−0.682)*(0.99*0.66))))))=0.638. If assignor D agrees with assignors A and C but disagrees with assignor B, overall semantic relevance=((0.143*(0.99*0.66))/((0.143*(0.99*0.66))+((1−0.143)*(1−0.99*0.66))))=0.243. If all of the general assignors disagree on the assignment of a particular occurrence of a term, overall semantic relevance=((0.143*(1−0.99*0.66)/(((0.143*(1−0.99*0.66))+((1−0.143)*(0.99*0.66))))))=0.0813.

With respect to the 986 terms, 48 of the terms can occur in three documents, 19 of the terms can occur in four documents, 9 of the terms can occur in five documents, and 5 of the terms can occur in all six documents. The terms 'UN Security Council,' 'council,' 'serious,' 'possible,' and 'refused' can all occur in at least three of the documents.

The proper name UN Security Council can occur in all six documents without semantic ambiguity (each of the general assignors agree on the interpretation of each occurrence of the term). As such, a response to a search request for the term 'UN Security Council' can return all six documents, each with an overall semantic relevance value of 0.86 as calculated above. The term 'council' can occur in all six documents with semantic ambiguity (the general assignors do not all agree on the interpretation that should be assigned to each occurrence of the term). As such, in response to a search request for a specific interpretation of council, each of the six documents can be returned in a ranked order based on overall semantic relevance values.

Figure 2:
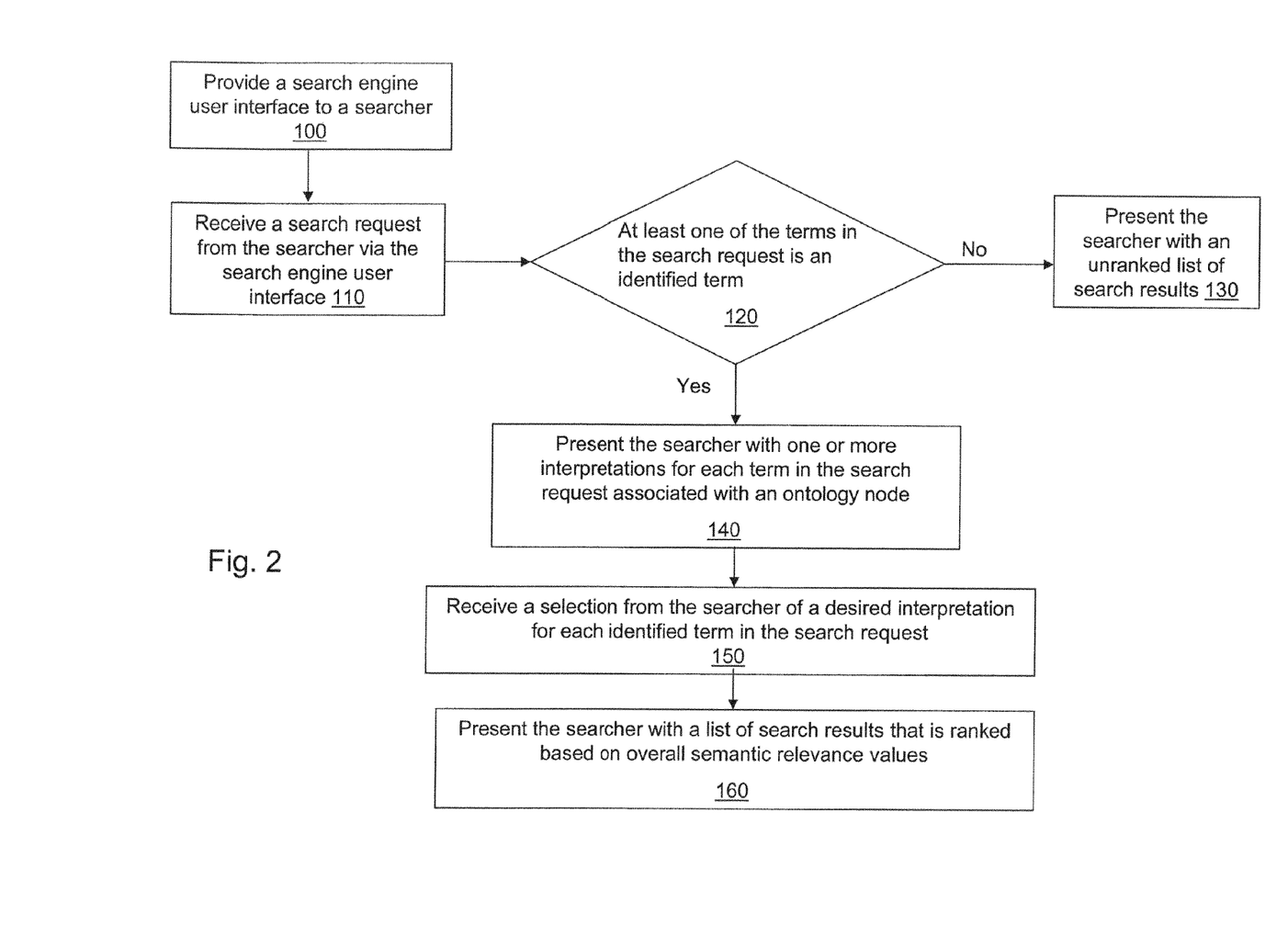
FIG. 2 is a flow diagram illustrating a process for responding to a search request in accordance with an exemplary embodiment.

FIG. 2 is a flow diagram illustrating the processing of a search request by the search engine in accordance with an exemplary embodiment. In an operation 100, a search engine user interface is provided to a searcher. In an operation 110, a search request is received from a searcher via the search engine user interface. The search request can be in the form of terms consisting of one or more words or phrases. In decision block 120, a determination is made regarding whether at least one of the terms in the search request is an identified term in the document index. If the search request does not include any identified terms, the searcher can be presented with an unranked list of search results in an operation 130. An unranked list of search results can be obtained via a binary matching and keyword approach or other known search technique. Alternatively, the searcher can be presented with an empty search results list or an error message. If the search request includes at least one identified term, the searcher is presented with one or more identified interpretations for each identified term in an operation 140.

in an operation 150, a desired interpretation selection for each identified term in the search request is received from the searcher. In one embodiment, the searcher can decline to select an identified interpretation. Alternatively, the searcher can be required to select an identified interpretation for each identified term within the search request. In an operation 160, the searcher is presented with a list of search results that are ranked based on the overall semantic relevance values described with reference to FIG. 1.

Figure 3:
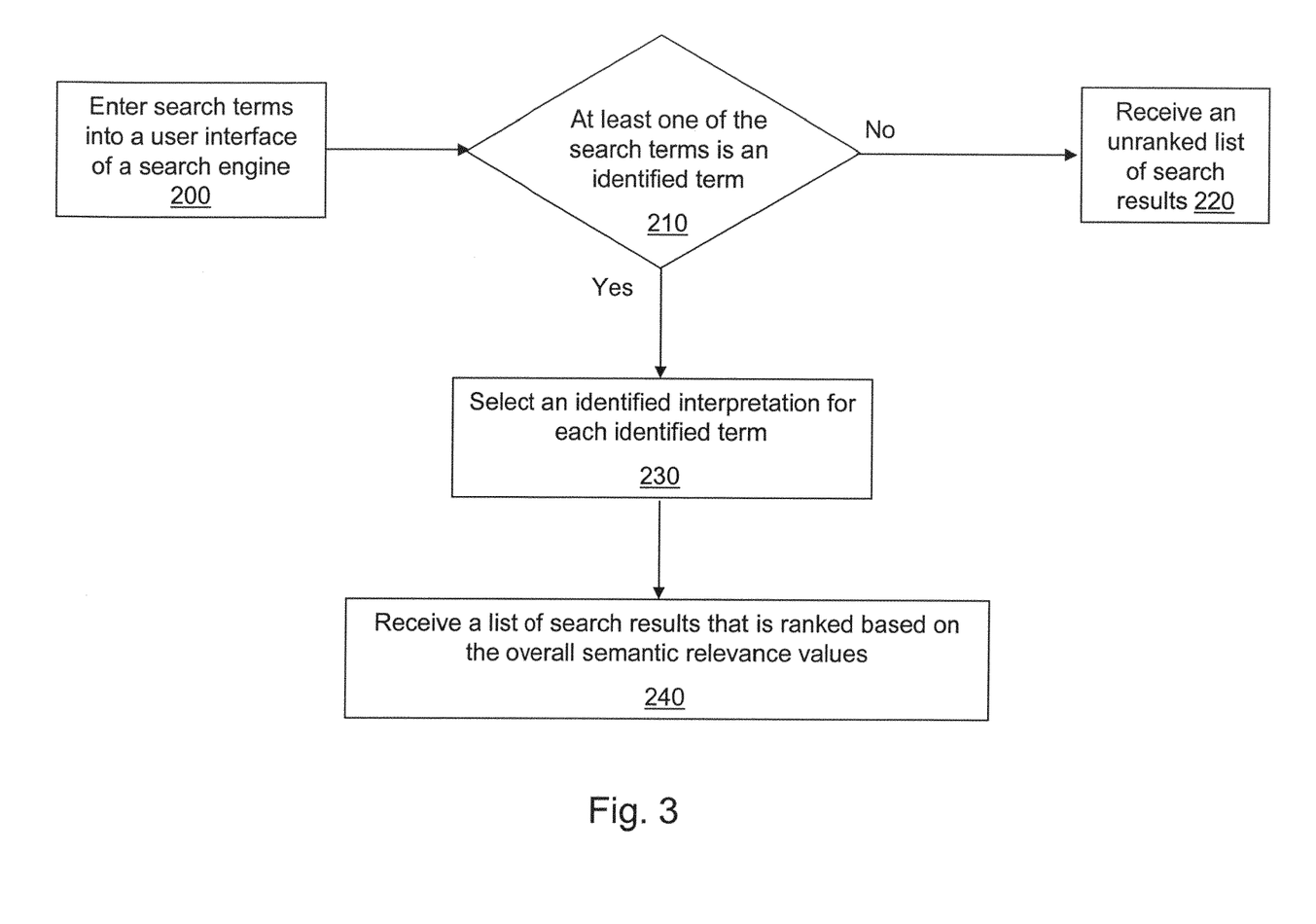
FIG. 3 is a flow diagram illustrating a process of requesting a search in accordance with an exemplary embodiment.

FIG. 3 is a flow diagram illustrating the process of conducting a search using the search engine in accordance with an exemplary embodiment. In an operation 200, a searcher enters search terms into a user interface of the search engine. In decision block 210, a determination is made regarding whether at least one of the entered terms is an identified term. If the search request entered by the searcher does not include any identified terms, the searcher receives an unranked list of search results in an operation 220. Alternatively, the searcher can receive an empty search results list or an error message. If the search request includes at least one identified term, the searcher selects one or more identified interpretations for each identified term in an operation 230. Depending on the embodiment, the searcher can select multiple identified interpretations for each identified term. In one embodiment, the searcher can prioritize multiple selected interpretations of an identified term. In an operation 240, the searcher receives a list of search results that is ranked based on the overall semantic relevance values described with reference to FIG. 1.

Figure 4:
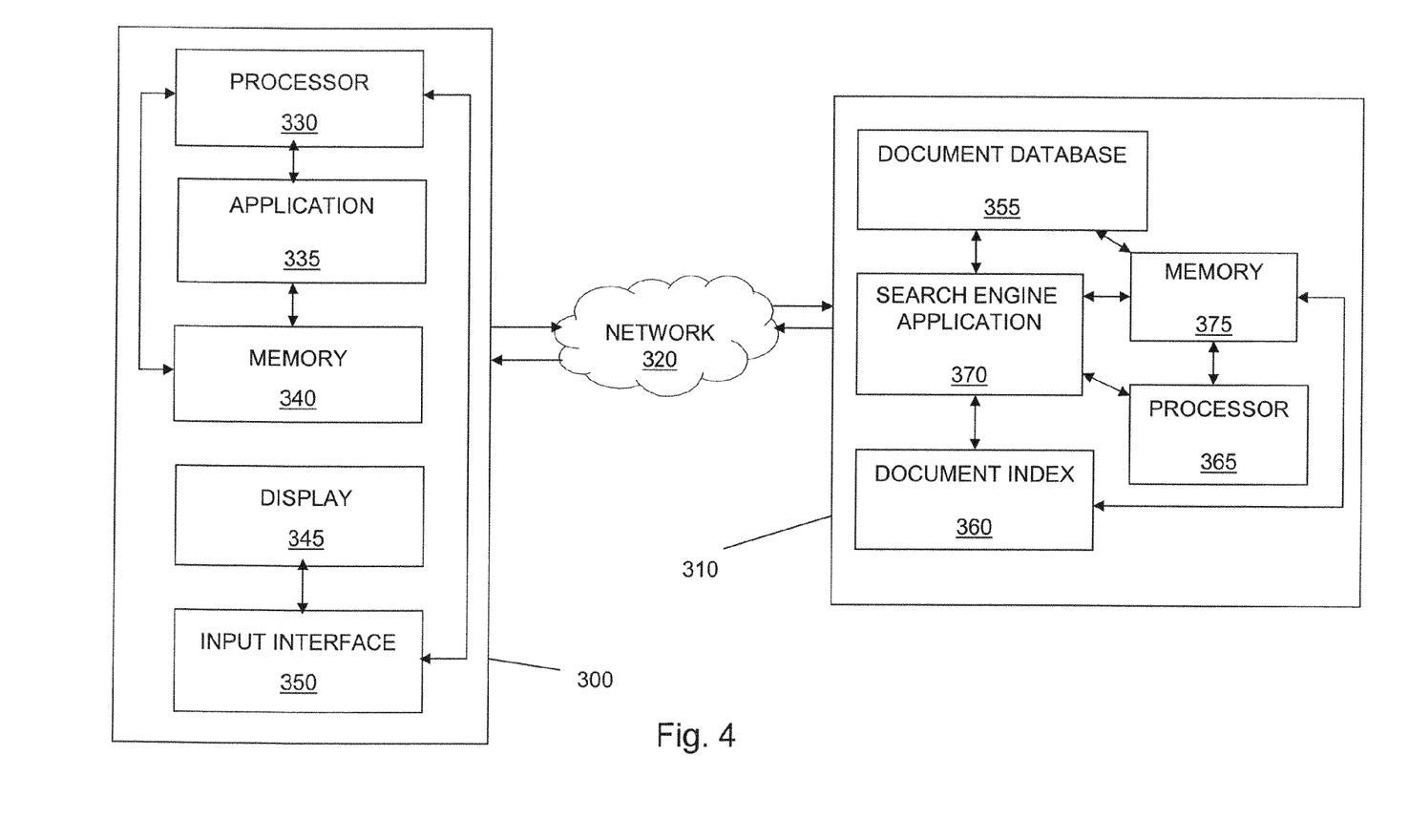
FIG. 4 depicts a system for requesting and responding to a search request in accordance with an exemplary embodiment.

FIG. 4 depicts an exemplary system for implementing the embodiments described with reference to FIGS. 1-3. A user device 300 can be connected to a provider device 310 via a network 320. The network 320 can be the Internet or any other network through which devices can share information. The user device 300 can be a desktop computer, laptop computer, cell phone, personal digital assistant, portable gaming unit, or any other device capable of presenting a search engine user interface to a user (searcher).

The user device 300 includes a memory 340, a processor 330, an application 335, a display 345, and an input interface 350. The application 335 can be stored in the memory 340 of the user device 300 and executed by the processor 330. The application 335 can be a web browser or any other application capable of presenting a user with a search engine user interface. The display 345 allows a user to view an application window, such as a search engine user interface, while the application is being executed as known to those skilled in the art both now and in the future. The input interface 350 allows a user to communicate with the application 335 through the application window. The input interface 350 can be a mouse, keyboard, remote control, touch screen, device panel, or any other interface by which a user can interact with the application 335 as known to those skilled in the art both now and in the future.

The provider device 310 includes a memory 375, a processor 365, a search engine application 370, a document index 360, and a document database 355. In an alternative embodiment, one or both of the document index and the document database can be integrated into the search engine application. The search engine application 370 can be stored in the memory 375 and executed by the processor 365. The search engine application 370 can be capable of performing any and/or all of the processes described with reference to FIGS. 1 through 2. The document database 355 and the document index 360 can be stored in the memory 375 and accessed by the search engine application 370. The provider device 310 and the user device 300 can communicate with each other via the network 320. In one embodiment, the search engine can be embodied in a standalone device.

There are several parameters that can be used to gauge the effectiveness of a search engine. One such parameter is probabilistic recall, which can be defined as the proportion of search results correctly returned by a search engine searching a corpus to the total number of correct search results contained within the corpus. Thus, a higher value of probabilistic recall implies a more effective search engine. Recall is a property of all search engines that allows user to evaluate the effectiveness of a search to find all the documents in the corpus that are relevant to the searcher's intended query. Search engines with better recall return a greater percentage of all documents in the corpus that are relevant to the query than search engines with poor recall. A user of a search engine can use the recall to determine if they need to use another search engine or a reformulated query to return a greater percentage of relevant documents to their query. Unfortunately in practice, despite the value of recall, it is impossible to calculate recall for a single search engine searching the world wide web, because it is impossible to know, in advance, how many relevant documents exist in the corpus due to the size and complexity of a large corpus such as the world wide web. The only way to estimate Recall for a large complex corpus is to use a probabilistic recall. Probabilistic recall can be represented by Equation 9.

Equation 9:

PROBABILISTIC RECALL $$= \frac{DA\ 1\ \ldots \cup DA\ 30\ \ldots \cup DAn}{DA\ 1\ \cup DA\ 2\ \ldots \cup DAn} +$$

$$\left\{ \begin{bmatrix} \sum_{2}^{n} DA1 - (DA2 \cup DAn) + \\ \sum_{3}^{n} (DA2 - (DA1 \cup DAn)) + \\ \sum_{4}^{n} DA3 - (DA1 \cup DA2 \cup DAn) + \\ \sum_{5}^{n} DA4 - (DA1 \ldots \cup DA3 \cup DAn) \ldots \\ \sum_{n-1}^{n} DAn - (DA1 \ldots \cup DA(n-1)) \end{bmatrix} /n \right\} +$$

$$2 \left\{ n \sqrt{ \begin{bmatrix} \left(\sum_{2}^{n}(DA1 - (DA2 \cup DAn))^2 + \\ \sum_{3}^{n}(DA2 - (DA1 \cup DAn))^2 + \\ \sum_{n-1}^{n}(DAn - (DA1 \ldots \cup DA(n-1)))^2 \end{bmatrix} - \\ \left(\left(\sum_{2}^{n} DA1 - (DA2 \cup DAn)\right)^2 + \\ \left(\sum_{3}^{n} DA2 \cup (DA1 \cup DAn)\right)^2 + \\ \left(\sum_{n-1}^{n} DAn - (DA1 \ldots \cup DA(n-1))\right)^2 \end{bmatrix} } \right\} /n(n-1)$$

In other words, probabilistic recall can be defined as the union of all sets of unique documents that contain terms assigned to the same ontology node by general assignors divided by the union of all sets plus the average number of unique documents retrieved by each general assignor that are not retrieved by any other general assignor plus two times the standard deviation of the average number of unique documents retrieved by each general assignor that are not retrieved by any general assignor.

Probabilistic recall can be calculated for any corpus, for example, a corpus including 10,000 documents. If three assignors return 40, 50, and 55 documents in response to a particular query and an average number of unique documents retrieved by each general assignor that are not retrieved by any other general assignor is (13+15)/2=14, the sample standard deviation of the mean is 1.141. Probabilistic recall, for this example, is 60/(60+14+2(1.141))=0.78, where the union of all unique documents returned by the three assignors is 60. This implies the total number of documents is 60/0.78=76.8 documents.

Another example is the six document corpus described in the example above. However, the small size of this corpus (n=6) violates the assumptions inherent in equation 9. The results, therefore, are not valid. However, the example demonstrates the value of probabilistic recall using a simple example. The term 'serious' can be an identified term having interpretations of earnest, meaningful, and important. General assignor A can assign occurrences of serious in two documents to an 'earnest' ontological node, occurrences of serious in three documents to a 'meaningful' ontological node, and occurrences of serious in one document to an 'important ontological node. General assignor B can assign occurrences of serious in one document to an 'earnest' ontological node, occurrences of serious in three documents to a 'meaningful' ontological node, and occurrences of serious in one document to an 'important ontological node. General assignor C can assign occurrences of serious in four documents to an 'earnest' ontological node, occurrences of serious in one document to a 'meaningful' ontological node, and occurrences of serious in zero documents to an 'important ontological node. General assignor D can assign occurrences of serious in zero documents to an 'earnest' ontological node, occurrences of serious in four documents to a 'meaningful' ontological node, and occurrences of serious in zero documents to an 'important ontological node.

Probabilistic recall for a search request of the 'earnest' interpretation of serious in the corpus can be calculated from a mean number of new documents found by the four assignors=1.0, a sample standard deviation=1.0, and the union of all documents returned by all assignors=4. Thus, probabilistic recall=4/(4+1.0+2*1.0)=0.57. This value can be thought of as the percentage of documents correctly returned out of all existing correct documents. It follows that the predicted total number of documents containing the term serious with the meaning earnest is (4/0.57)=7.02.

Probabilistic recall for a search request of the 'meaningful' interpretation of serious in the corpus can be calculated from a mean number of new documents found by the four assignors=1.67, a sample standard deviation=577, and the union of al documents returned by all assignors=4. Thus, probabilistic recall=4/(4+1.67+2*0.577)=0.58. It follows that the predicted total number of documents containing the term serious with the meaningful interpretation is (4/0.58)=6.8.

Probabilistic recall for a search request of the 'important' interpretation of serious in the corpus can be calculated from a mean number of new documents found by the four assignors=0.0, a sample standard deviation=0.0, and the union of all documents returned by all assignors=1. Thus, probabilistic recall=1/(1+0+2*0)=1. It follows that the predicted total number of documents containing the term serious with the meaning important is 1.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. In several examples, flow charts were used in this description to describe exemplary embodiments. The use of flow charts is not meant to be limiting with respect to the order of operations performed. Further, any definitions included in the description are not meant to be limiting, but are included only to provide a basic understanding of terminology. It is intended that the scope of the invention be defined by the claims appended hereto and their equivalents.

What is claimed is:

1. A method for creating semantically relevant, ranked search results, the method comprising:
   at a computing device receiving an assignment of an occurrence of a term within a document to an ontological node based on usage of the occurrence of the term within the document;
   at a computing device determining an accuracy value associated with the received assignment by comparing the received assignment with a baseline assignment;
   at a computing device determining a consistency value associated with an assignor based on a repeatability of a plurality of assignments by the assignor;
   at a computing device determining an assignor relevance score for the assignor as the determined accuracy value multiplied by the determined consistency value;
   at a computing device determining an overall semantic relevance value for the occurrence of the term by statistically combining the assignor relevance scores determined for a plurality of assignors;
   at a computing device ranking the document based on the determined overall semantic relevance value; and
   at a computing device presenting the ranked documents in response to a search request including a keyword associated with the ontological node.

2. The method of claim 1, wherein the overall semantic relevance value for the occurrence of the term is determined using the assignor relevance score determined for the plurality of assignors and Bayes' Theorem.

3. The method of claim 1, further comprising receiving a search request.

4. The method of claim 3, further comprising generating a search result of ranked documents in response to the search request.

5. The method of claim 1, further comprising assigning a document identifier to the document.

6. The method of claim 5, further comprising assigning a term identifier to the term.

7. The method of claim 6, further comprising storing the overall semantic relevance value, the document identifier, and the term identifier in a document index.

8. The method of claim 1, further comprising identifying the term within the document.

9. The method of claim 1, further comprising identifying the interpretation of the term.

10. The method of claim 1, wherein Bayes' Theorem is applied to the accuracy value before the determined accuracy value is used to determine the assignor relevance score.

11. The method of claim 1, wherein Bayes' Theorem is applied to the consistency value before the determined consistency value is used to determine the assignor relevance score.

12. The method of claim 1, wherein the accuracy value is determined using $$\text{ACCURACY} = \frac{\sum \text{Correct Assigments by an Assignor}}{\sum \text{Total Assignments by the Assignor}}.$$

13. The method of claim 1, wherein the consistency value is determined using $$\text{CONSISTENCY} = \frac{m * p}{t * p}$$

where CONSISTENCY is the consistency value, m is a number of assignments of the term to the same ontological node, p is a number of the plurality of assignments, and t is a total number of terms assigned.

14. The method of claim 1, wherein the overall semantic relevance value for the occurrence of the term is determined using the assignor relevance score determined for the plurality of assignors and iterative application of Bayes' Theorem.

15. The method of claim 1, further comprising evaluating the assignor using a parametric hypothesis test.

16. A computer-readable medium having computer-readable instructions stored thereon which, when executed by a processor, cause a device to:
   receive an assignment of an occurrence of a term within a document to an ontological node based on usage of the occurrence of the term within the document;
   determine an accuracy value associated with the received assignment by comparing the received assignment with a baseline assignment;
   determine a consistency value associated with an assignor based on a repeatability of a plurality of assignments by the assignor;
   determine an assignor relevance score for the assignor as the determined accuracy value multiplied by the determined consistency value;
   determine an overall semantic relevance value for the occurrence of the term by statistically combining the assignor relevance scores determined for a plurality of assignors;
   rank the document based on the determined overall semantic relevance value; and
   present the ranked documents in response to a search request including a keyword associated with the ontological node.

17. The computer-readable medium of claim 16, having computer-readable instructions further configured to cause the device to store a document rank within a document index.

18. The computer-readable medium of claim 17, having computer-readable instructions further configured to cause the device to access the document index and a document database and to generate a search result of ranked documents in response to a search request.

19. A search engine device for creating semantically relevant, ranked search results, the search engine device comprising:
   an application, the application comprising computer code configured to receive an assignment of an occurrence of a term within a document to an ontological node based on usage of the occurrence of the term within the document;

determine an accuracy value associated with the received assignment by comparing the received assignment with a baseline assignment;

determine a consistency value associated with an assignor based on a repeatability of a plurality of assignments by the assignor;

determine an assignor relevance score for the assignor as the determined accuracy value multiplied by the determined consistency value;

determine an overall semantic relevance value for the occurrence of the term by statistically combining the assignor relevance scores determined for a plurality of assignors;

rank the document based on the determined overall semantic relevance value; and present the ranked documents in response to a search request including a keyword associated with the ontological node;

a memory, wherein the memory is configured to store the application; and a processor, wherein the processor is coupled to the memory and configured to execute the application.

* * * * *